Sept. 27, 1927.  
R. E. FRICKEY ET AL  
1,643,550
ENGINE CONTROLLER FOR WELDING SYSTEMS
Filed Dec. 26, 1925
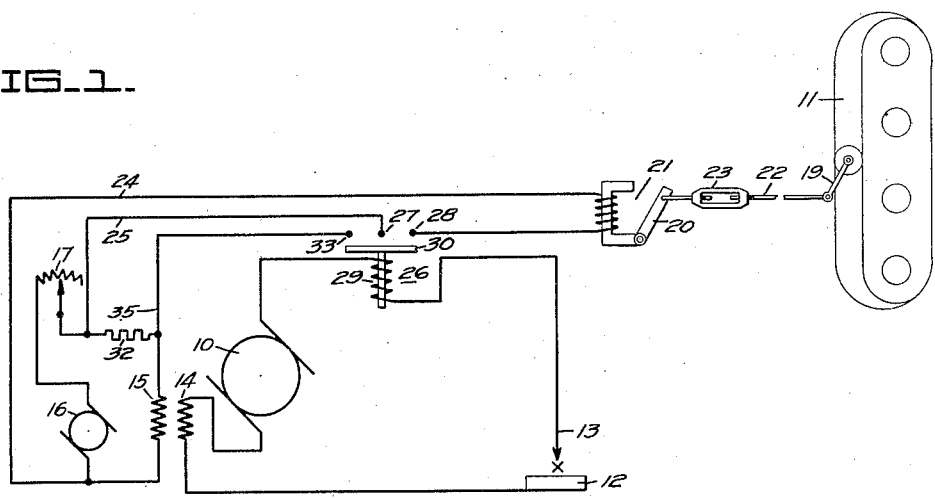
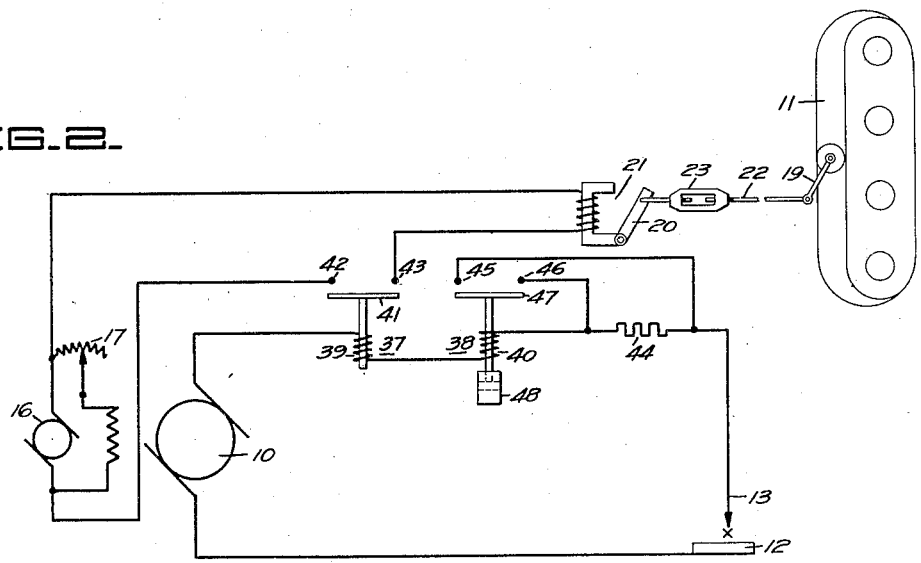
INVENTORS  
*Royal E. Frickey*  
BY *Arion S. Kalenborn*  
*White Frost*  
*their* ATTORNEYS Patented Sept. 27, 1927.

1,643,550

UNITED STATES PATENT OFFICE.

ROYAL E. FRICKEY, OF SAN FRANCISCO, AND ARION S. KALENBORN, OF REDWOOD CITY, CALIFORNIA.

ENGINE CONTROLLER FOR WELDING SYSTEMS.

Application filed December 26, 1925. Serial No. 77,698.

This invention relates to welding systems and particularly to arc welding systems which employ a portable generator driven by a gas engine. In such systems the weight and cost of the generator unit are important factors. With systems of the prior art it is necessary to employ a gas engine or a prime mover of much greater output than that actually required to carry the normal output load of the generator. An engine of smaller capacity which may develop sufficient power to drive the generator at normal operating loads is unable to properly absorb the load upon initial closing of the welding circuit. The load being placed suddenly upon the engine its speed and correspondingly its power output is diminished and it is subsequently unable to return to normal operating speed.

It is an object of this invention to so distribute the load upon the driving engine of a welding generator unit that an engine may be employed which has a normal output only slightly greater than that required to carry the operating load.

It is a further object of this invention to devise a welding system in which the welding power consumption is prevented from rising to its normal value for a substantial interval after closing the welding circuit and to provide means for accelerating the speed of the engine during this interval.

It is a further object of this invention to employ a magnetic control for accelerating the speed of the engine and to energize the magnetic control from a source of energy controlled by a contactor responsive to the flow of current in the welding circuit.

It is a further object of this invention to devise an arc welding system in which the sticking of the electrodes upon initially striking the arc is prevented by employing means causing the current flowing initially in the welding circuit to be substantially less than the normal operating current.

It is a further object of this invention to control the speed of an engine driving a welding generator so that the normal operating speed of the engine will be greater than the normal no-load speed and so that the engine speed will be accelerated to a value greater than the normal operating speed upon initially placing the load upon the generator.

Further objects of the invention will appear from the following detailed description in which the preferred embodiment of the invention has been set forth. It is to be understood that the invention is not limited to any specific apparatus except as defined by the appended claims.

Referring to the drawings:

Figure 1 is a circuit diagram showing the system of this invention.

Fig. 2 is a circuit diagram of a modification of the invention.

Referring to the arrangement shown in Fig. 1, the welding generator 10 is driven by means of a suitable prime mover, such as internal combustion engine 11. The welding circuit supplied by the generator includes the electrodes 12 and 13 between which the welding arc is struck, the electrode 12 being the object upon which a weld is to be made. The direct current generator shown is preferably of the type which is provided with a differentially wound field coil 14 which is in series with the welding circuit so that when the welding circuit is short circuited, as in initially contacting the electrodes, the current will be reduced to a minimum. If an alternating current generator is employed it is preferably of the type which has a high internal inductive reactance or an external reactance may be connected in series with the welding circuit so that the power consumption in the welding circuit will rise gradually to its normal operating value upon contacting the electrodes. The field 15 of the welding generator 10 is excited by means of the generator 16, the value of the exciting current being controlled by a rheostat 17.

The driving engine 11 is preferably supplied with both a traveling speed governor and a throttle control lever 19. In order to automatically control the throttle lever 19 this lever is connected to the movable armature 20 of a magnetic controller 21 by means of the rod 22. The length of the rod 22 is preferably adjustable by suitable means such as a turn buckle 23. The magnetic controller is energized from some suitable source of energy such as the exciting generator 16 by means of the conductors 24 and 25. In order to energize the magnetic controller 21 in response to closing of the welding circuit there is employed a contactor 26 having its two contacts 27 and 28 connected in series with the conductor 25. The solenoid 29 of the contactor is connected in series with the welding system in order to cause the movable contact 30 to move upwardly upon flow of current in the welding circuit. A resistance 32 is inserted in series with the exciting generator 16 and the terminals of this resistance are connected to the contacts 33 and 27 of the actuator 26, by means of the conductors 25 and 35 so that it will be shunted out when the contacts 33 and 27 are shorted by means of the movable contact 30. Since the field 15 has a relatively high inductance and as the exciting current is not increased to normal until shunting of the resistance 32 responsive to closing of the welding circuit, the output voltage of the generator will rise gradually to its normal value after contacting the electrodes. This feature in addition to the use of a reversed series field direct current generator, or of a high reactance alternating current generator, affords means for preventing the power consumption in the welding circuit from rising to its normal operating value for a substantial interval after contacting the electrodes. In most instances the initial current flowing in the welding circuit is less than the normal operating current but this condition is not essential as it is possible to have an initial power consumption which is less than normal even though the current is greater than normal, especially in alternating current systems.

The operation of the above circuit is as follows: Upon contacting the electrodes 12 and 13 the welding circuit is momentarily shorted but because of the provision which has been made for preventing the welding current from rising suddenly to its normal value the full operating load does not come upon the generator 10 until after a substantial interval following the closing of the welding circuit. However, the actuator 26 is immediately energized to cause the movable contact 30 to move upwardly and short the three contacts 33, 27 and 28. Shorting of the contacts 27 and 28 causes the magnetic controller 21 to be energized to move the armature 20 and open the throttle of the engine 11. The speed of the engine is accordingly accelerated, beginning almost immediately with the closing of the circuit. Shorting of contacts 33 and 27 shunts out the resistance 32 to impress full exciting potential across the field 15. As the field of the welding generator builds up and the power consumption in the welding circuit rises to its normal value, full load comes upon the generator 10 and the speed of the engine 11 drops down to its normal operating speed at which it develops sufficient power to drive the generator 10. When the arc is struck, the contactor remains closed, the engine is driving the welding generator at a predetermined operating speed, and the generator voltage and current are normoal. The degree of control imparted by the magnetic controller 21 may be adjusted by means of the turn buckle 23. In order to minimize wear upon the engine 11 it is preferable to adjust the governor and the throttle lever 19 so that the no-load speed of the engine is less than the normal operating speed.

In the modification shown in Fig. 2 a different means has been employed for preventing the current in the welding circuit from rising suddenly to its normal value upon closing the welding circuit. In this case two contactors 37 and 38 are provided having their solenoids 39 and 40 connected in series with the welding circuit. The movable contact 41 of the contactor 37 is adapted to move upwardly upon closing of the welding circuit to short the contacts 42 and 43, thus causing the magnetic controller 21 to be energized. An impedance 44, which is reactive in case an alternating current generator is employed, is inserted in series with the welding circuit and is adapted to be shunted upon shorting of the contacts 45 and 46 by means of the movable contact 47. The movement of the contact 47 is retarded by suitable means such as a dash pot 48. In operating this arrangement the movable contact 41 of the contactor 37 is moved upwardly immediately upon making contacts between the two electrodes to short the contacts 42 and 43 and energize the magnetic controller 21. However, since the movement of the movable contact 47 is retarded by means of the dash pot 48 the load upon the generator 10 will be substantially less than its normal operating value and the engine 11 has sufficient time to accelerate to a speed greater than its normal operating speed. After the engine has attained its speed greater than normal the movable contact 47 will short the contacts 45 and 46 to shunt out the series impedance 44 and cause full load to be placed upon the generator. At the time the arc is struck between the electrodes the engine speed will have dropped down to its normal operating speed.

By means of this invention it will be noted that full operating load is not placed upon the engine until the speed of the engine has reached a value greater than the normal operating speed. Therefore, it is possible to employ a driving engine whose output is only slightly greater than the power required to drive the generator under normal operating loads. This acceleration of the engine is made possible by the provision of means for preventing the power consumption in the welding circuit from rising to its normal operating value for a substantial interval following closing of the welding circuit. The current control is of further advantage in that if full load is allowed to come upon the welding circuit upon contacting the electrodes the electrodes are apt to stick together before the arc can be struck. However, by bringing on the load gradually this sticking can be prevented.

We claim:

1. A welding system comprising a welding circuit, a generator associated with the welding circuit and adapted to supply a normal operating power output to the same, means for causing the power output in the welding circuit to be less than normal for a substantial interval upon initially closing the welding circuit, means for driving the generator, and means responsive to the closing of the welding circuit to cause said means to initially accelerate the speed of the generator.

2. A welding system comprising a welding circuit, a generator associated with the welding circuit and adapted to supply a normal operating current to the same, means for causing the power consumption in the welding circuit to be less than normal for a substantial interval upon initially closing the welding circuit, means for driving the generator, and means responsive to the closing of the welding circuit to cause said means to initially accelerate the speed of the driving means.

3. A welding system comprising a welding circuit, a generator associated with the welding circuit and adapted to supply a normal operating current to the same, means for causing the power consumption in the welding circuit to be less than normal for a substantial interval upon initially closing the welding circuit, a prime mover for driving the generator at a given speed while the welding circuit is open, and means responsive to the closing of the welding circuit to increase the speed of the prime mover.

4. A welding system comprising a welding circuit, a generator associated with the welding circuit and adapted to supply a normal operating current to the same, means for causing the power consumption in the welding circuit to be less than normal for a substantial interval upon initially closing the welding circuit, a prime mover for driving the generator at a given speed while the welding circuit is open, magnetic means for controlling the speed of the prime mover, and means responsive to the closing of the welding circuit to energize said magnetic means to increase the speed of the prime mover.

5. A welding system comprising a welding circuit, a generator associated with the welding circuit and adapted to supply a normal operating current to the same, means for causing the power consumption in the welding circuit to be less than normal for a substantial interval upon initially closing the welding circuit, a prime mover for driving the generator at a given speed while the welding circuit is open, magnetic means for controlling the speed of the prime mover, and means including a contactor actuated upon flow of current in the welding circuit for energizing said magnetic means to increase the speed of the prime mover.

6. A welding system comprising a welding circuit, a generator associated with said circuit and adapted to supply a normal operating current to the same, means for causing the power consumption in the welding circuit to be less than normal for a substantial interval upon initially closing the welding circuit, a prime mover for driving the generator at a given speed during normal operation of the welding circuit, and means responsive to the closing of the welding circuit to initially increase the speed of the prime mover above said given speed.

7. A welding system comprising a welding circuit, a generator associated with said circuit and adapted to supply a normal operating current to the same, means for causing the power consumption in the welding circuit to be less than normal for a substantial interval upon initially closing the welding circuit, a prime mover for driving the generator at a given speed during normal operation of the welding circuit, magnetic means for controlling the speed of the prime mover, and means responsive to the closing of the welding circuit to energize said magnetic means to initially increase the speed of the prime mover above said given speed.

8. A welding system comprising a generator supplying a welding circuit, a prime mover adapted to drive the generator at a given speed while the welding circuit is open, and means responsive to the closing of the welding circuit for automatically controlling the speed of the prime mover to cause the generator to be driven at an increased operating speed while the welding circuit is closed, said means causing the generator to be initially driven at a speed greater than the normal operating speed upon closing of the welding circuit.

9. A welding system comprising a generator supplying a welding circuit, driving means for the generator, means for automatically increasing the available power output from said driving means during a short interval immediately following closing of the welding circuit, and means for preventing the power consumption of the welding circuit from rising to normal for a substantial interval after closing the welding circuit.

10. An arc welding system comprising a welding circuit having a pair of electrodes, a generator for supplying the welding circuit, with a normal operating current, and means for initially causing the current in the welding circuit to be substantially less than normal upon closing of the welding circuit to prevent sticking of the electrodes.

In testimony whereof, we have hereunto set our hands.

ROYAL E. FRICKEY.
ARION S. KALENBORN.